Sept. 10, 1935.  K. L. HERRMANN  2,014,204
LUBRICATING MEANS FOR ANTIFRICTION BEARINGS
Filed Aug. 1, 1934  2 Sheets-Sheet 2

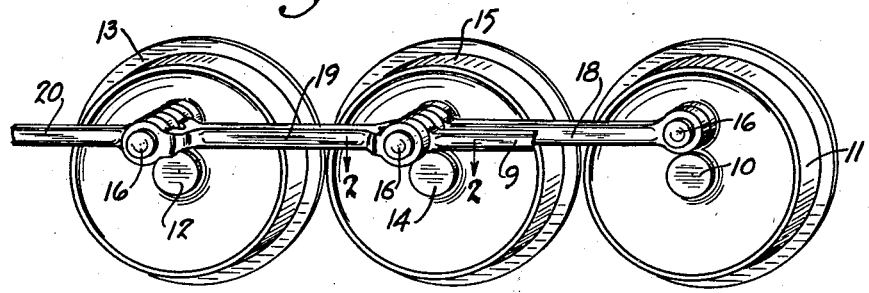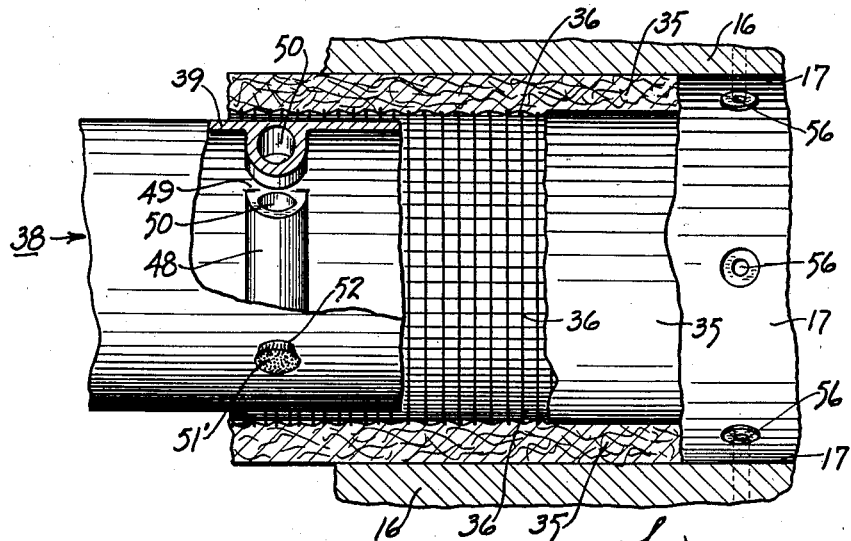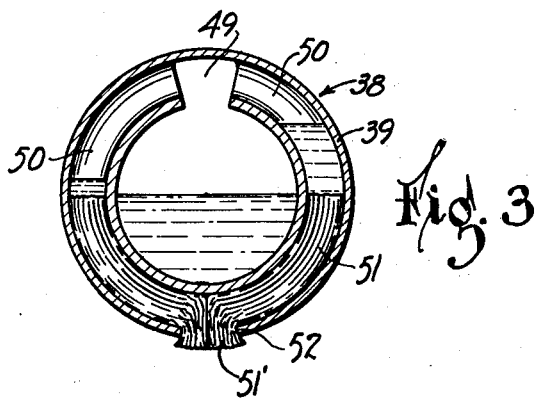

INVENTOR.
Karl L. Herrmann
BY
ATTORNEY.

Patented Sept. 10, 1935

2,014,204

UNITED STATES PATENT OFFICE 2,014,204

LUBRICATING MEANS FOR ANTIFRICTION BEARINGS

Karl L. Herrmann, South Bend, Ind.

Application August 1, 1934, Serial No. 737,905

6 Claims. (Cl. 308—121)

My invention relates to drive rod constructions such as used on locomotives and the like, and has for its principal object to provide a suitable and efficient lubricating means therefor.

A further object is to provide in a locomotive drive rod construction, means to provide a level of lubricant in the crank pin whereby the bearings may be properly supplied with lubricant therefrom.

Another object is to provide a lubricant carrying cartridge or cylinder detachably mounted in the crank pin of a locomotive drive from which the lubricant is distributed to the bearings on the crank pin.

A further object is to provide a crank pin having a bore in one end thereof in which is mounted a cylinder formed of lubricant distributing material adapted to receive the lubricant from a cartridge inserted therein and distribute the lubricant to one or more bearings on the crank pin.

A further object is to provide a crank pin having a bore in the end thereof adapted to receive a cylinder formed of lubricant distributing material, within which is mounted a cartridge formed to distribute lubricant to the cylinder from whence the lubricant is directed through ports in the crank pin to the several bearings thereon.

Other objects, and objects relating to details of construction and methods of manufacture will be apparent from the detailed description to follow.

The invention, both as to the construction employed by way of illustration and its method of operation, together with the objects and advantages derived therefrom, will best be understood from the following description of a specific embodiment thereof when read in connection with the accompanying drawings in which like reference numerals refer to like parts throughout the several views.

Fig. 1 is a diagrammatic perspective view of a locomotive drive truck in which my invention is incorporated.

Fig. 3 is a transverse sectional view taken on the line 3—3 of Fig. 2, showing further details of the lubricant containing cartridge.

Fig. 4 is an enlarged fragmentary view showing a portion of the cartridge in full lines with a portion thereof broken away, together with sectional and elevational parts of the cylinder, mounted in the bore of the crank pin surrounding the cartridge.

Figure 2:
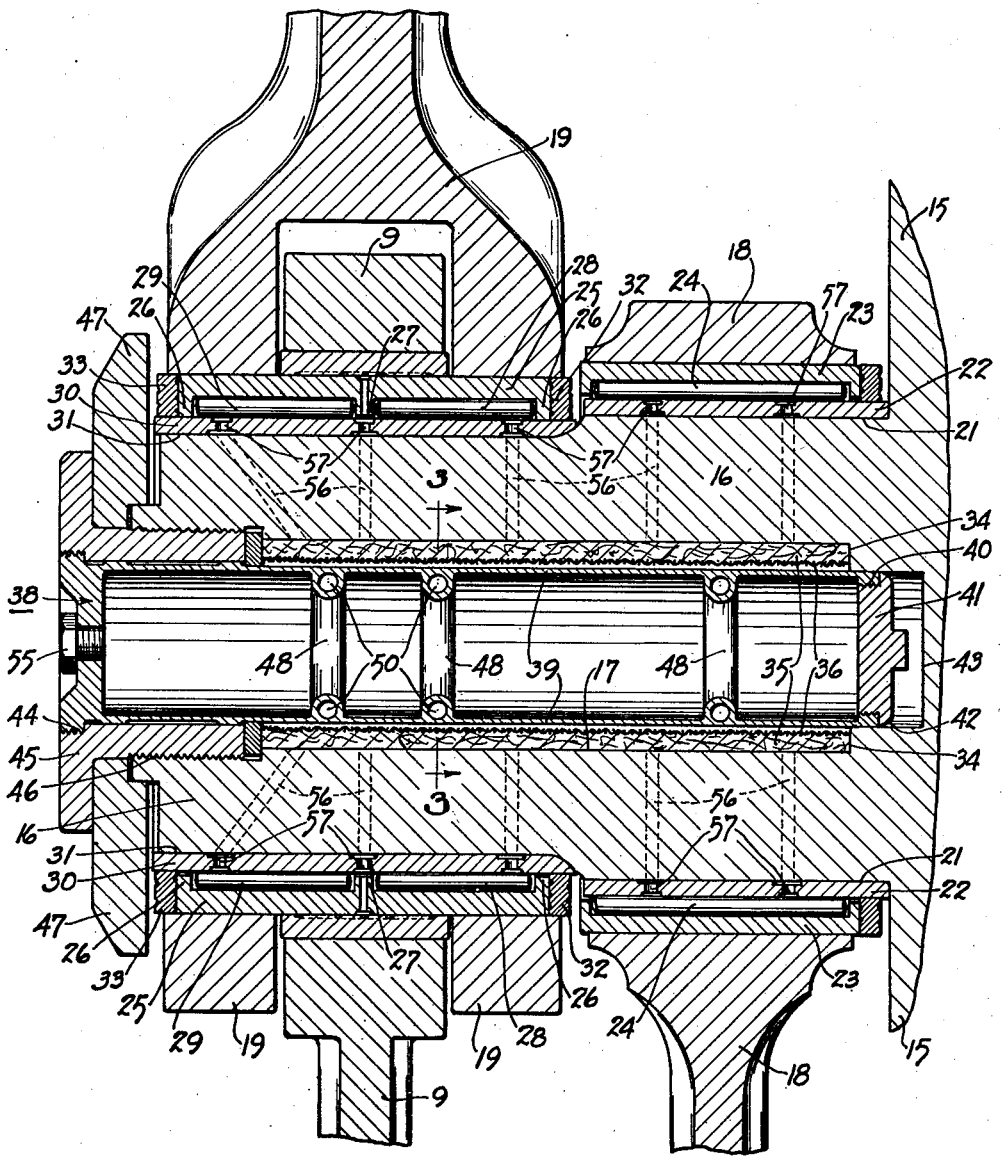
Fig. 2 is an enlarged fragmentary detailed sectional view taken on the line 2—2 of Fig. 1.

In Fig. 1 I have diagrammatically illustrated a locomotive drive truck including a main drive rod 9, a driver axle 10 having a wheel 11 thereon, a front driver axle 12 with a wheel 13 thereon, and an intermediate driver axle 14 with a wheel 15 thereon. The wheels 11, 13 and 15 are each provided with a crank pin 16 which are bored at 17 to receive the lubricating means presently to be described. The wheels 11 and 15 are connected by the rod 18 which fits over bearings on the crank pins 16 on the respective wheels and the wheels 13 and 15 are connected by the rod 19 which also fits over bearings on the crank pins 16 on the respective wheels, the rod 19 being forked at both ends to straddle the rods 9 and 20. As each of the crank pins is preferably provided with similar lubricating means, an illustration and description of the detailed parts of one crank pin and its associated parts is thought to be sufficient.

As shown in Fig. 2, the crank pin 16 extending from the wheel 15 has a journal face 21 over which is fitted a bushing 22. The rod 18 has a flanged bushing 23 fittted therein and row of anti-friction rollers 24 is interposed between the bushings 22 and 23 to relieve the load on the bushings and provide a drive having the minimum amount of friction. As previously stated, the rod 19 is forked to straddle the driving rod 9 and it has a bushing 25 fitted therein which, as illustrated, is provided with flanges 26 at its opposite ends and a flange 27 formed centrally thereof to provide two race-ways for the rows of rollers 28 and 29 surrounding the bushings 30 forming the inner race member which is fitted over the reduced end 31 of the crank pin 16. Locking rings 32 and 33 are secured to the inner race member 30 to prevent longitudinal movement of the outer race member 25 and with it the rollers 28 and 29.

The bore 17 in the rank pin 16 is formed to provide a shoulder 34 at its inner end, in which is inserted a cylinder 35 of felt or other suitable material adapted to abut against the shoulder 34, as shown in Fig. 2. If desired, the cylinder 35 may be made of felt, rolled cloth, woven wire, and in some installations, cotton or waste may be used. The cylinder 17 preferably includes a screen 36 forming the inner face to maintain the cylinder in cylindrical form and prevent the material from becoming damaged or wasting away.

A cartridge or lubricant container, indicated generally by the numeral 38, is inserted in the tube 35, the cartridge having a cylindrical wall or shell 39 screw-threaded at its inner end to receive the detachable end plate 41 which is preferably beveled at 42 to permit its easy insertion in to the reduced end portion 43 of the bore 17 in which it is supported. The outer end of the cartridge 38 is screw-threaded at 44 into the flanged lock nut 45 which is screw-threaded at 46 into the crank pin 16 so that both ends of the cartridge are firmly supported but it may be detached and removed from the crank pin as a unit. Interposed between the outer end of the crank pin 16 and the lock nut 45 is a dust ring 47 which forms a shield for the bearings and also prevents accidental outward movement of the rod 19. The cartridge 38 is provided with a plurality of radially extending lubricant conductors 48, each of which extends substantially around the inner face of the cartridge but are provided with open ends 49, as best shown in Figs. 3 and 4. Each of the lubricant conductors 48 are apertured at 50 and into which is inserted a wick 51. Opposite the open end 49 of each lubricant conductor 48, the casing 39 is drilled at 52 so that the end 51' of the wick 51 extends therethrough, as shown in Fig. 3, to wipe against the inner face of the ring 35. As illustrated, the wick 51 extends only half way around the aperture 50 or, in other words, in the position shown the upper half of the aperture 50 is left open to receive the lubricant and conduct it to the wick, from which it is absorbed by the tube 35 and then delivered to the bearings. The outer end of the cartridge 38 is drilled to receive the filler plug 55 which may be removed to refill the cartridge with lubricant.

In assembling the oiling mechanism, the cartridge 38 is filled with lubricant to the level shown in Fig. 3 and is then inserted in the bore 17 with the inner end of the cartridge seating in the reduced portion 43 thereof, the outer end thereof being screw-threaded into the flange nut 45. During rotation of the cartridge with the crank pin oil will be carried into the apertures 50 in the oil conductors 48 to lubricate the wick 51 so that as the exposed end 51' thereof contacts with the oil absorbing ring 35 that lubricant will be carried thereto from whence the oil is conducted through the several oil passages 56 to the bushing or inner race members 22 and 30 which are also provided with oil passages 57 so that lubricant will be carried to the rollers 24, 28 and 29 to thus lubricate the bearings for the rods connecting the wheels as shown.

As lubricant is used from the cartridge 38 the filler plug 55 may be removed and the cartridge can be refilled or when it is desired to clean the ring 35, the cartridge may be removed so that the ring 35 may also be removed from the bore 17 in the crank pin 16 making it easy to maintain a fresh supply of clean lubricant at all times for the bearing and also so change the lubricant quickly with the minimum expense.

While I have shown one embodiment of my invention, it is to be understood that changes in details of construction and methods of operation can be resorted to without departing from the spirit and substance of my invention, the scope of which is to be measured entirely by the scope of the sub-joined claims.

What I claim is:

1. In a locomotive drive construction, a hollow crank pin having lubricant passageways through its walls, anti-friction bearings on said crank pin, a lubricant-absorbing cylinder in said crank pin, a lubricant-containing cartridge supported in said crank pin in spaced relation to said cylinder, and lubricant-conducting means carried by said cartridge engaging with said cylinder whereby the lubricant is conducted from said cartridge to said cylinder, through the wall of said cylinder, and through said passage-ways in said crank pin to said bearings.

2. In a locomotive drive construction, a hollow crank pin having lubricant passageways through its walls, anti-friction bearings on said crank pin, a lubricant-directing cylinder in said crank pin, a lubricant-containing cartridge supported in said crank pin in spaced relation to said cylinder, lubricant-conducting passage-ways in said cartridge, and wicks in said conducting passage-ways engaging said cylinder whereby the lubricant is conducted to said cylinder and through the passage-ways in said crank pin to said bearings.

3. In a locomotive drive construction, a hollow crank pin having lubricant passage-ways through its walls, anti-friction bearings on said crank pin, a lubricant-directing cylinder in said crank pin, a lubricant-containing cartridge supported in said crank pin in spaced relation to said cylinder, lubricant-conducting passage-ways in said cartridge, and wicks in said conducting passageways having ends extending through apertures in said cartridge into engagement with said cylinder whereby the lubricant is conducted to said cylinder and through the passageways in said crank pin to said bearings.

4. Means for lubricating a plurality of anti-friction bearings from a common source comprising, a hollow rotatable member having passage-ways through its walls supporting said bearings, a cylinder formed of lubricant-absorbing material supported in said rotatable member, a lubricant container detachably supported in said rotatable member in spaced relation to said cylinder, lubricant-conducting passage-ways in said container, and means extending from said conducting passage-ways engaging with said cylinder whereby the lubricant is conducted from said container to said cylinder and through the passageways in said rotatable member to said bearings.

5. Means for lubricating a plurality of anti-friction bearings from a common source comprising, a hollow rotatable member having passage-ways through its walls supporting said bearings, a cylinder formed of lubricant-absorbing material supported in said rotatable member, a lubricant container detachably supported in said rotatable member in spaced relation to said cylinder, lubricant-conducting passage-ways in said container, and wicks in said conducting passage-ways having portions thereof extending through the wall of said container into engagement with said cylinder whereby the lubricant is conducted from said container to said cylinder and through the passage-ways in said rotatable member to said bearings.

6. Means for lubricating anti-friction bearings comprising, a rotatable member having radially extending passage-ways through its walls supporting said bearings, a lubricant-absorbing cylinder in said rotatable member, a lubricant container within said cylinder supported in said rotatable member, and lubricant-conducting means carried by said container engaging with said cylinder whereby lubricant is conducted from said container to said cylinder, through the wall of said cylinder, and through said passage-ways to said bearings.

KARL L. HERRMANN.